(12) United States Patent
Yeh et al.

(10) Patent No.: US 8,377,517 B2
(45) Date of Patent: Feb. 19, 2013

(54) METHOD OF FORMING TRANSFLECTIVE LIQUID CRYSTAL DISPLAY PANEL

(75) Inventors: Pi-Chun Yeh, Hsin-Chu (TW); Yue-Shih Jeng, Hsin-Chu (TW); Chih-Jen Hu, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 808 days.

(21) Appl. No.: 12/463,437

(22) Filed: May 11, 2009

(65) Prior Publication Data
US 2010/0047468 A1 Feb. 25, 2010

(30) Foreign Application Priority Data

Aug. 21, 2008 (TW) .............................. 97131891 A

(51) Int. Cl.
*C08F 2/48* (2006.01)
(52) U.S. Cl. ........ 427/508; 427/384; 427/457; 427/495; 427/553
(58) Field of Classification Search .................. 427/457, 427/495, 508, 553, 384
See application file for complete search history.

(56) References Cited

U.S. PATENT DOCUMENTS

| 5,926,241 | A | 7/1999 | Gunning, III |
| 7,442,567 | B2 | 10/2008 | Yan et al. |
| 2004/0218126 | A1 | 11/2004 | Kim |
| 2005/0140863 | A1 | 6/2005 | Ha |
| 2005/0174515 | A1 | 8/2005 | Tung et al. |
| 2006/0262256 | A1 | 11/2006 | Kim |
| 2007/0139587 | A1 | 6/2007 | Chen et al. |
| 2007/0252931 | A1 | 11/2007 | Wu |

FOREIGN PATENT DOCUMENTS

| JP | 2004206131 | 7/2004 |
| JP | 200562616 | 3/2005 |
| JP | 2005-338476 | 12/2005 |
| JP | 2006323386 | 11/2006 |
| TW | I230295 | 4/2005 |
| TW | I274909 | 3/2007 |
| TW | I282584 | 6/2007 |

*Primary Examiner* — Robert S Walters, Jr.
(74) *Attorney, Agent, or Firm* — Winston Hsu; Scott Margo

(57) ABSTRACT

A method of forming transflective LCD panel includes forming a compensation material having reactive liquid crystal monomers, thermal initiators and a solvent on a first substrate. Then, a first heating process is performed on the compensation material to remove parts of the solvent and then a photo-polymerizing process is performed, and parts of the compensation material disposed in a reflective region are turned into birefringent zones. Moreover, a second heating process is performed, in which the first substrate is kept in a predetermined temperature for a predetermined time, and thereafter nitrogen gas flows in to the chamber to form a non-oxygen condition. Accordingly, parts of the compensation material disposed in a transmission region are turned into isotropic zones. The predetermined temperature of the second heating process is higher than the clearing point of the reactive liquid crystal monomers.

20 Claims, 13 Drawing Sheets

METHOD OF FORMING TRANSFLECTIVE LIQUID CRYSTAL DISPLAY PANEL

BACKGROUND OF THE INVENTION

1. Field of the Invention

The present invention relates to a method of forming a transflective liquid crystal display (LCD) panel, and more particularly, to a method of forming a transflective LCD panel that has a patterned compensation film.

2. Description of the Prior Art

Most LCDs can be categorized into the transmissive type, the reflective type, and the transflective type. The transmissive LCD uses backlight as a source for emitting light. The light emitted by the backlight will pass through the LCD panel to let an observer see the image displayed on the LCD panel. The reflective LCD has a reflective electrode. When displaying the image, the ambient light of the reflective LCD will enter the LCD from the observer side of the LCD and then be reflected by the reflective electrode. The reflected light will pass through the LCD panel again, and finally the observer can see the image displayed on the LCD. The transflective LCD has the LCD both of transmissive type and reflective type. In other words, each sub-pixel region of the LCD panel comprises a transmission region and a reflection region, wherein the transmission region uses a backlight, and the reflection region uses an ambient light as a light source.

Please refer to FIG. 1, which is a schematic diagram of sub-pixel regions of a traditional transflective LCD panel. As shown in FIG. 1, a traditional transflective LCD panel 10 includes an array substrate 20, a color filter substrate 30, and a liquid crystal layer 40 disposed between the array substrate 20 and the color filter substrate 30. A backlight module 50 is disposed in the back of the traditional transflective LCD panel 10 as a light source for the transmissive part of the panel.

The array substrate 20 includes a plurality of sub-pixel regions 21, and each of the sub-pixel regions 21 includes a reflection region 12 and a transmission region 14. The array substrate 20 also includes a glass substrate 22, a polarizer 23 disposed on the bottom surface of the glass substrate 22, a plurality of thin-film transistors (not shown) disposed on the top surface of the glass substrate 22, a plurality of transparent pixel electrodes 25 electrically connected to the thin-film transistors, a plurality of dielectric layers 26 disposed in a portion of the sub-pixel regions 21, and a plurality of reflective layers 24 disposed on the top surface of the dielectric layer 26. The reflective layer 24 includes a conductive material electrically connected to the thin-film transistors, and functions as reflective electrodes of the array substrate 20. In addition, the dielectric layer 26 has a rough surface, so that the reflective layer 24 can have a rough surface for scattering light beams.

The color filter substrate 30 includes a glass substrate 31, a polarizer 32 disposed on the top surface of the glass substrate 31, and a plurality of color filters 33 disposed corresponding to the sub-pixel regions 21 and on the bottom surface of the glass substrate 31.

Because the transmission region 14 of the transflective LCD panel 10 uses a backlight as the light source, the light will pass through the liquid crystal layer 40 only once. The reflection region 12 uses the ambient light as a light source, so that the light will pass through the liquid crystal layer 40 twice. In such a case, because the phase difference in the reflection region 12 is twice as big as that in the transmission region 14, the display image quality is reduced. For this reason, the traditional transflective LCD panel 10 further includes a compensation film to compensate for the phase difference caused by the transflective LCD panel 10. Since the transflective LCD panel 10 includes both the reflection region 12 and the transmission region 14, it is still a challenge to provide a compensation film that cause different phase compensations corresponding to the reflection region 12 and the transmission region 14 respectively. However, it is difficult for the prior art to form such a compensation film, and the process complexity of fabricating the traditional transflective LCD panel 10 is therefore greatly increased.

SUMMARY OF THE INVENTION

It is therefore an objective of the present invention to provide a method of forming a transflective LCD panel so as to form a patterned compensation film of the transflective LCD panel for solving the above-mentioned problems.

According to an embodiment of the present invention, a method of forming a transflective LCD panel is disclosed. First, a first substrate is provided. The first substrate includes a color filter layer disposed on a side, and further includes at least one transmission region and at least one reflective region. Subsequently, a compensation material is formed on the color filter layer. The compensation material includes a plurality of reactive liquid crystal monomers and at least one thermal initiator. Next, a first heating process on the compensation material is performed. Furthermore, a photo-polymerizing process is performed to polymerize portions of the compensation material so as to form a birefringent zone of a patterned compensation film that corresponds to the reflective region. Following that, a second heating process is performed to maintain the first substrate at a predetermined temperature for a first time period. Next, the first substrate is maintained in a non-oxygen condition and at the predetermined temperature for a second time period, so as to form an isotropic zone of the patterned compensation film that corresponds to the transmission region. Thereafter, a second substrate paralleling the first substrate is provided. Next, a liquid crystal layer disposed between the first and the second substrates is provided.

These and other objectives of the present invention will no doubt become obvious to those of ordinary skill in the art after reading the following detailed description of the preferred embodiment that is illustrated in the various figures and drawings.

DETAILED DESCRIPTION

To provide a better understanding of the presented invention, preferred embodiments will be made in details. The preferred embodiments of the present invention are illustrated in the accompanying drawings with numbered elements.

Figure 7:
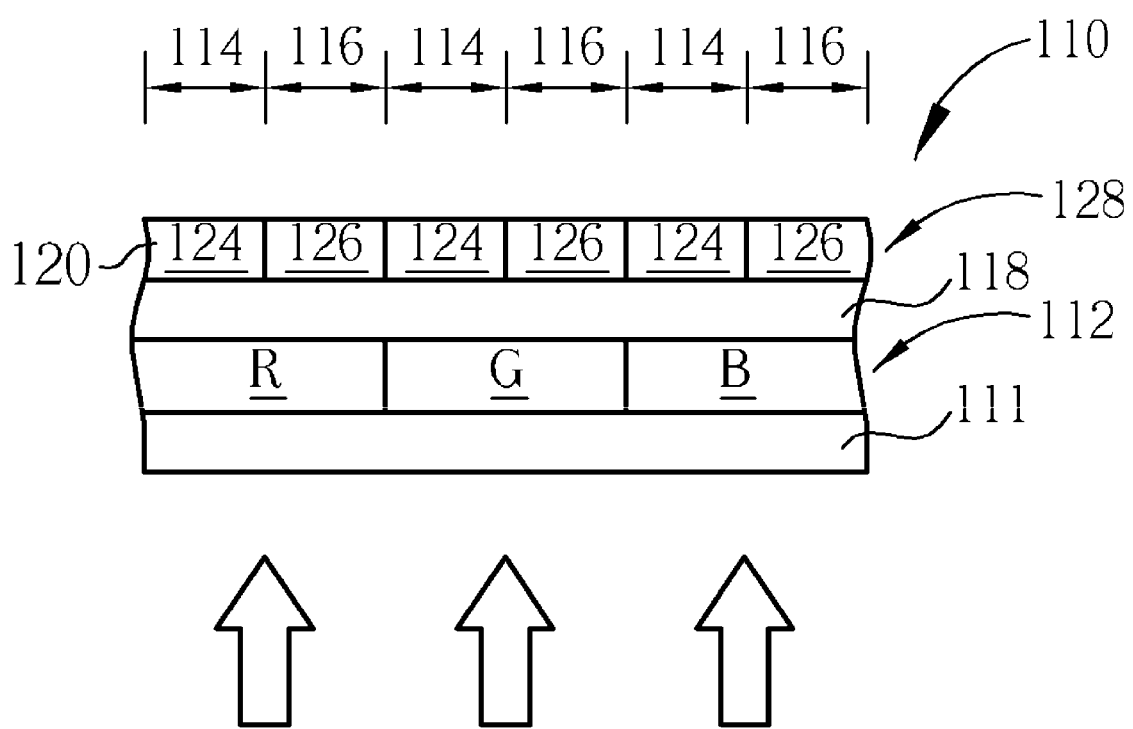
Figure 8:
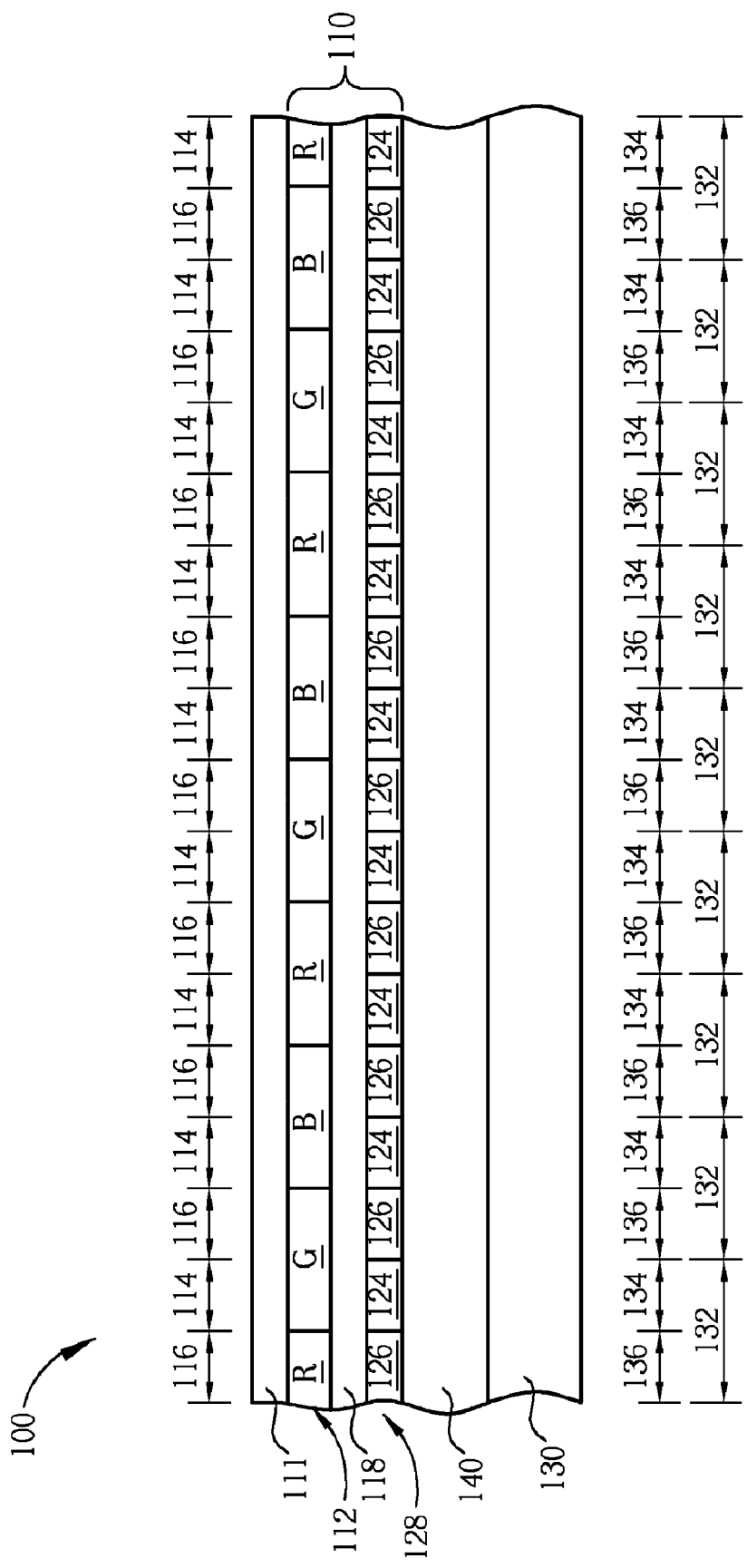
Figure 9:
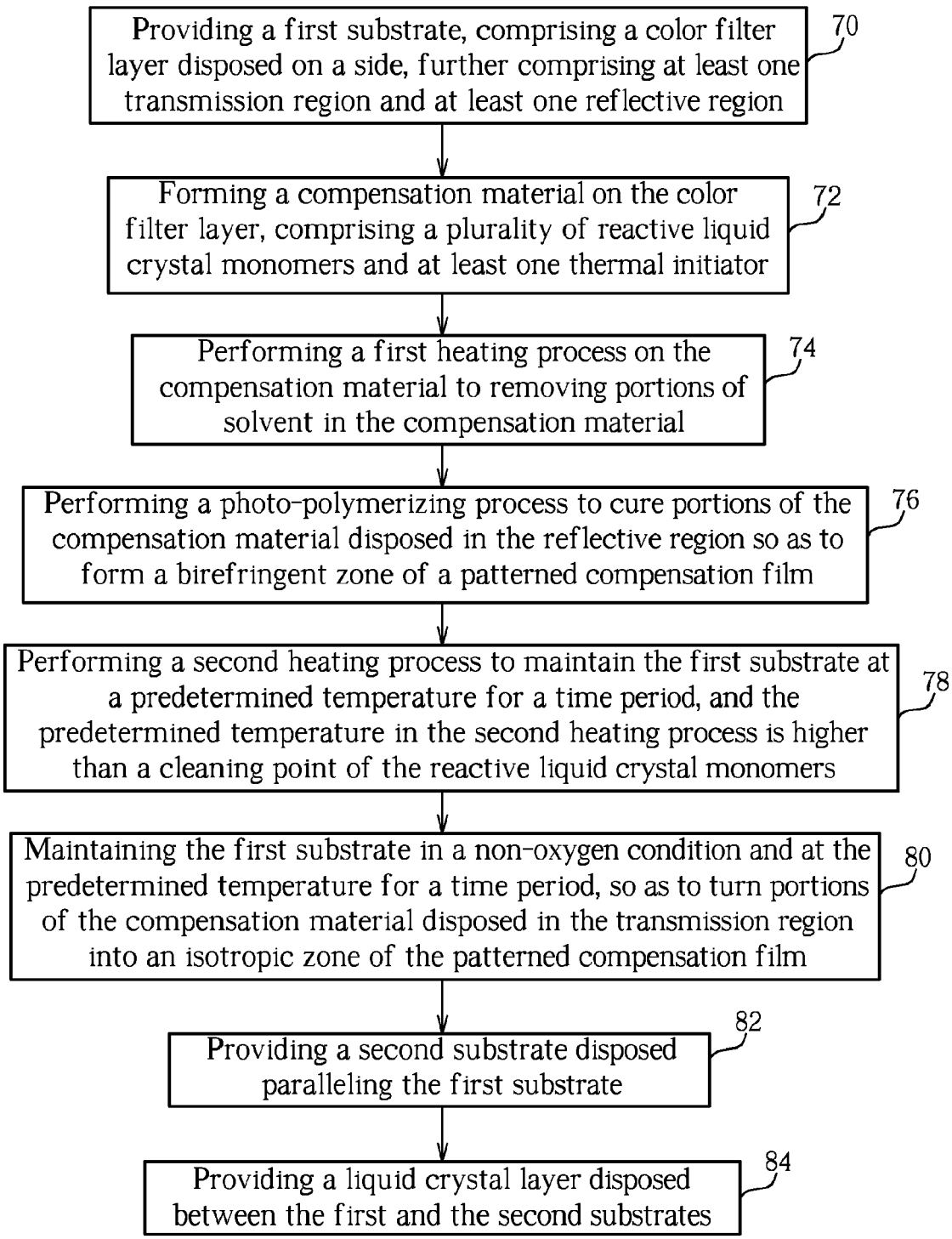
FIG. 9 is a flow chart illustrating the method of forming the transflective LCD panel according to the preferred embodiment of the present invention.

Please refer to FIG. 2 through FIG. 9. FIG. 2 through FIG. 8 are schematic diagrams illustrating a method of forming a transflective LCD panel in accordance with one preferred embodiment of the present invention, and FIG. 9 is a flow chart illustrating the method of forming the transflective LCD panel according to the preferred embodiment of the present invention, where like numbered numerals designate similar or the same parts, regions or elements. It is to be understood that the drawings are not drawn to scale and are served only for illustration purposes.

Figure 1:
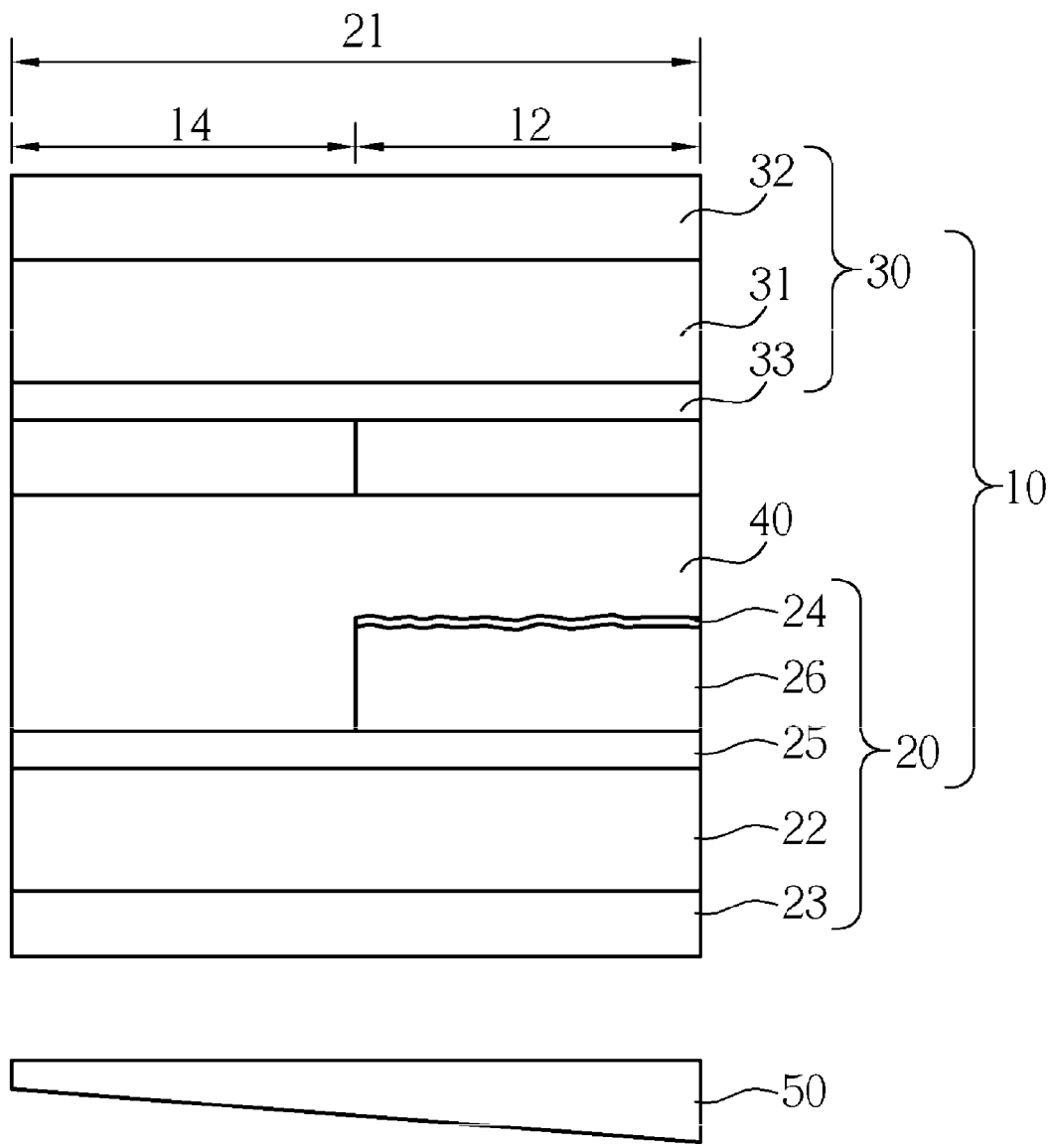
FIG. 1 is a schematic diagram of sub-pixel regions of a traditional transflective LCD panel.
Figure 2:
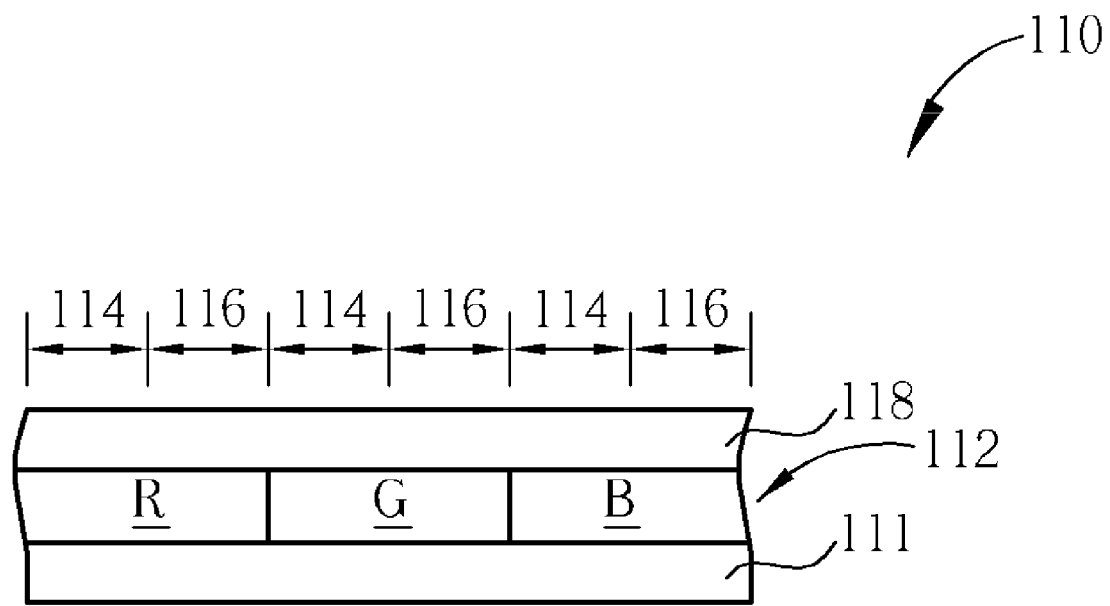
FIG. 2 through FIG. 8 are schematic diagrams illustrating a method of forming a transflective LCD panel in accordance with one preferred embodiment of the present invention.

As shown in FIG. 2 and the step 70 of FIG. 9, a first substrate 110 is first provided, as a color filter substrate of the transflective LCD panel 100. The first substrate 110 can include transparent substrate 111, and a color filter layer 112 disposed on the transparent substrate 111. Substantially, an alignment layer 118 can be formed on the surface of the color filter layer 112 to assist liquid crystal molecules in orientating by utilizing a mechanical alignment process or a photo alignment process.

The color filter layer 112 can include color filters with various colors, and each color filter can correspond to each sub-pixel region of the transflective LCD panel 100 respectively. For example, the color filter layer 112 can include at least one red color filter R, at least one green color filter G and at least one blue color filter B, but dose not limited thereto. Each of the sub-pixel regions can include at least one transmission region 116 and at least one reflective region 114. In other words, the red color filter R can include at least one transmission region 116 and at least one reflective region 114, and so do the green color filter G and the blue color filter B.

Figure 3:
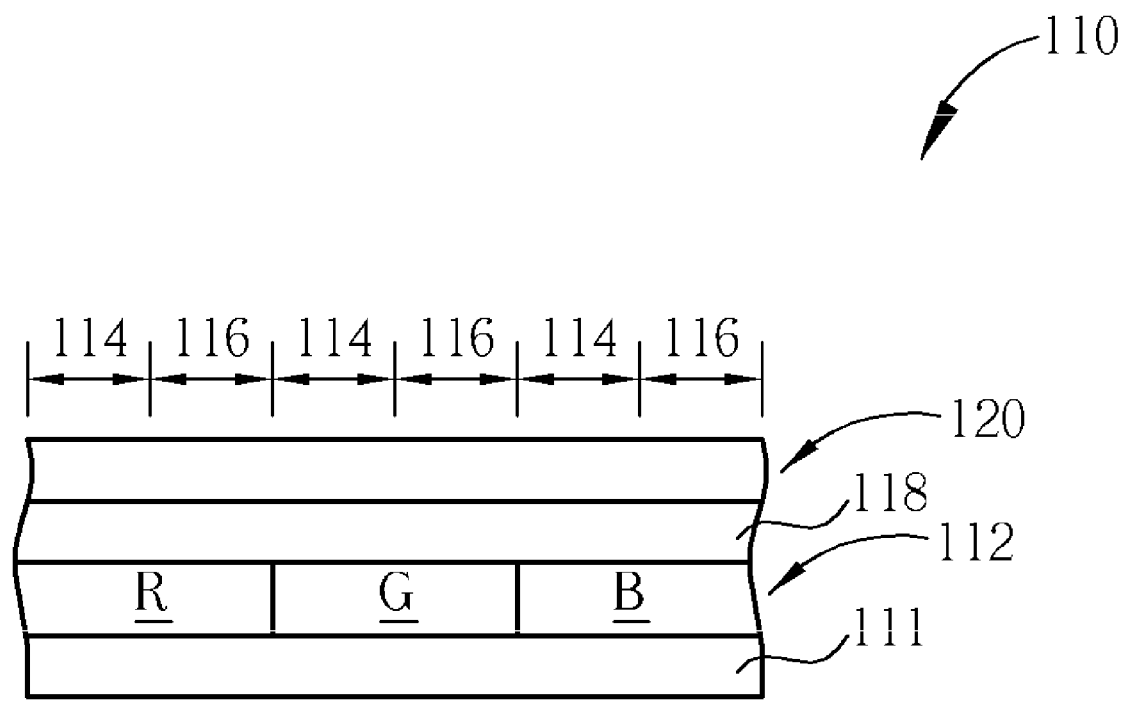

As shown in FIG. 3 and the step 72 of FIG. 9, a compensation material 120 is thereafter formed on the surface of the alignment layer 118 by a coating process, such as a spin coating process, a slit and spin coating process, or a spinless coating process. The compensation material 120 can include a plurality of reactive liquid crystal monomers, at least one thermal initiator, at least one photo initiator and at least one solvent. The thermal initiator is at least one substance that can cause at least one chemical reaction by heating, so to polymerize the reactive liquid crystal monomers and to form polymers. The reactive liquid crystal monomers can therefore form liquid crystal having the birefringence. The thermal initiator can include lauroyl peroxide (LPO), cumene hydroperoxide, tert-butyl peroxybenzoate (TBPB), tert-butyl peroxide, benzoyl peroxide, 2-methylpropionitrile, cyclohexanecarbonitrile, tert-amyl peroxybenzoate, 4,4-azobis(4-cyanovaleric acid), 1,1'-azobis(cyclohexanecarbonitrile), 2,2'-azobisisobutyronitrile (AIBN), 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butylperoxy isopropyl carbonate, cyclohexanone peroxide, dicumyl peroxide, 2,4-pentanedione peroxide, peracetic acid, potassium persulfate or a mixture of at least two of the above-mentioned materials. The photo initiator is at least one substance that can cause at least one chemical reaction by light, and can include 2-isopropylthioxanthone (ITX), 2-chlorothioxanthone (CTX), 2-methyl-1-[4-(methylthio)phenyl]-2-morpholinopropanone-1,1-chloro-4-propoxythioxanthone (OPTX), 2-benzyl-2-(dimethylamino)-1-[4-(4-morpholinyl)phenyl]-1-butanone, 2,4,6-trimethyl benzoyl diphenyl phosphine oxide (TPO), 1-hydroxy cyclohexyl phenyl ketone, 2-hydroxy-2-methylphenyl-propan-1-one, or a mixture of at least two of the above-mentioned materials. The solvent can include methyl ethyl ketone (MEK), toluene, propylene glycol methyl ether acetate (PGMEA), cyclohexanone, ethyl acetate, or a mixture of at least two of the above-mentioned materials.

For instance, according to this embodiment, the compensation material 120 can include LC242 (trade name) of BASF Company as the reactive liquid crystal monomers, TPO as the photo initiator, TBPB as the thermal initiator, and PGMEA as the solvent, where the reactive liquid crystal monomers can include the following chemical formula:

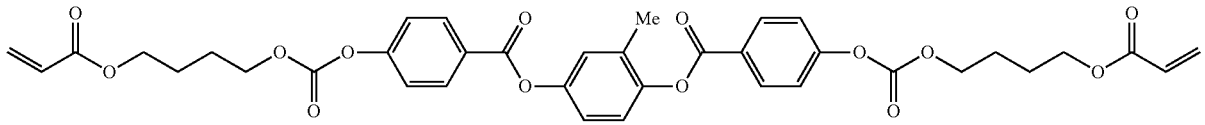 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

In addition, it should be understood by one skill in this art that the composition of the compensation material 120 can be adjusted according to the product design or the processes requirement. For example, the compensation material 120 can include other additives, and should not be limited thereto.

Figure 4:
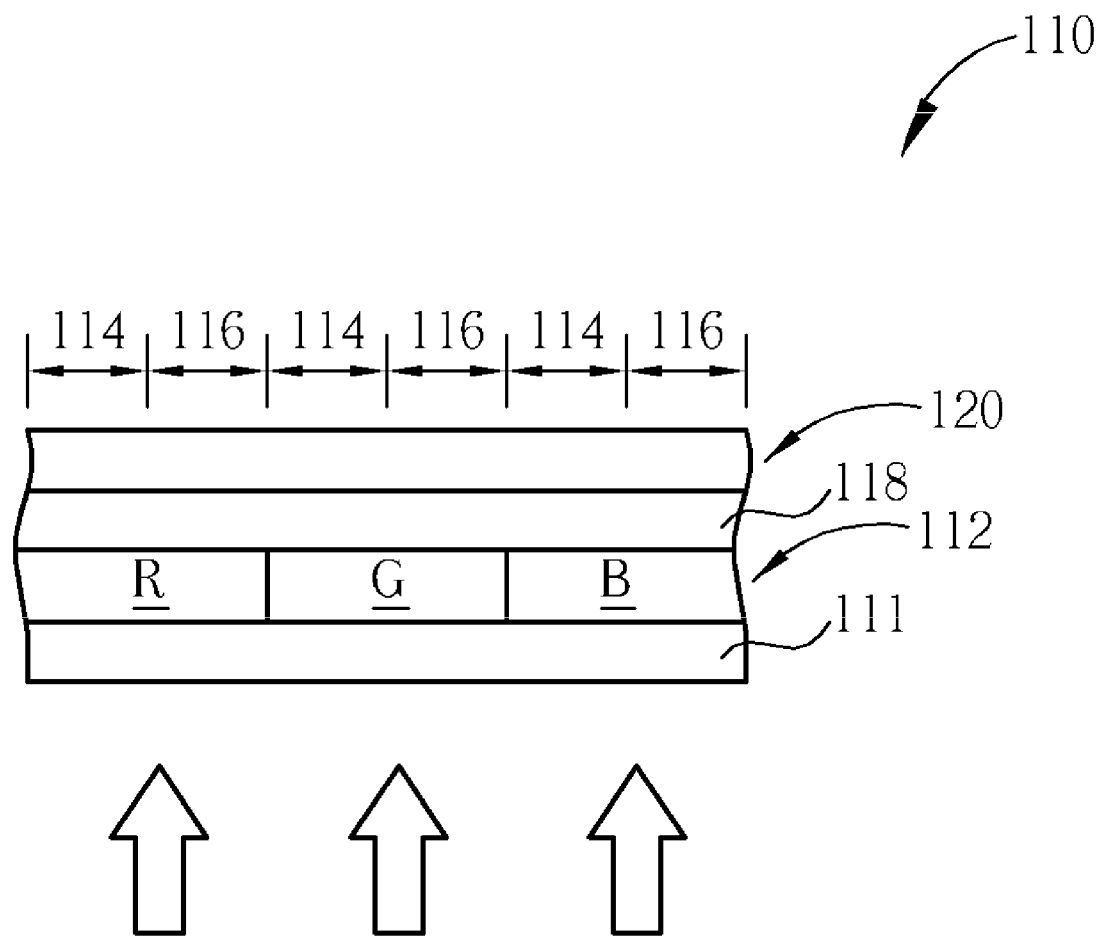

As shown in FIG. 4 and the step 74 of FIG. 9, a first heating process is next performed on the compensation material 120. The first heating process can include baking process, which maintains the first substrate 110 in a temperature range from 50° C. to 90° C. for a time period substantially longer than or equal to 30 seconds. Thus, most of the solvent contained in the compensation material 120 can vaporize and be removed.

Figure 5:
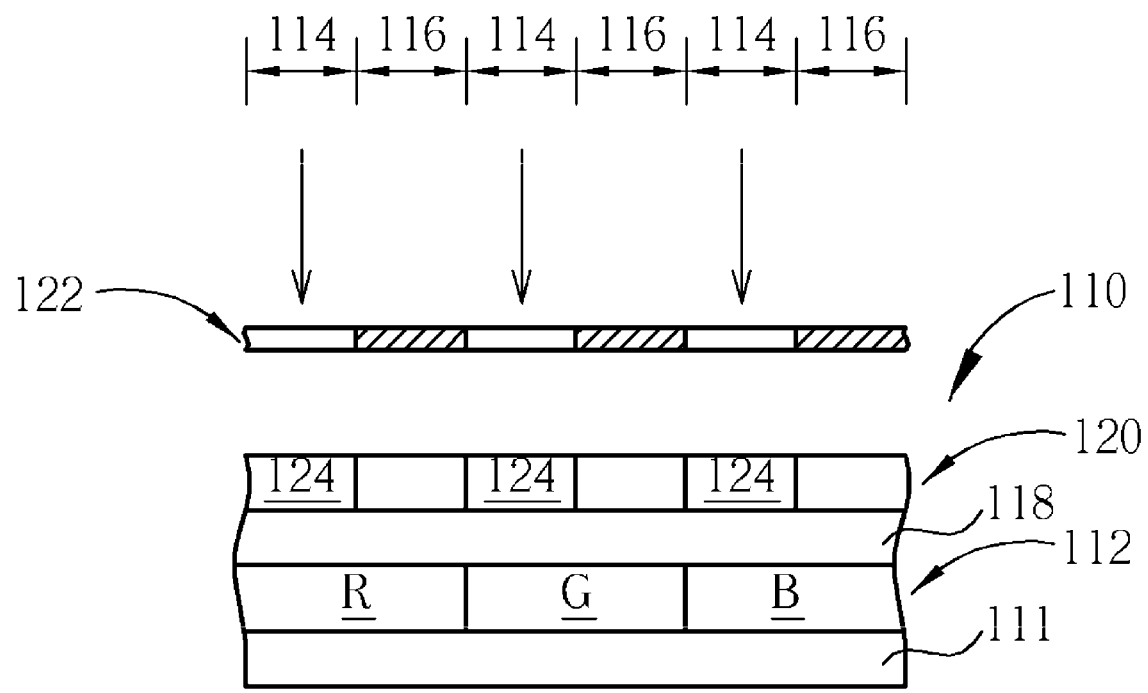

Afterward, as shown in FIG. 5 and the step 76 of FIG. 9, a photo-polymerizing process, such as an ultraviolet (UV) curing process, is performed. The photo-polymerizing process utilizes a mask 122 to cover portions of the compensation material 120 disposed corresponding to the transmission region 116, and the mask 122 exposes portions of the compensation material 120 disposed corresponding to the reflective region 114 so that the exposed portions of the compensation material 120 can be turned into a birefringent zone 124 of a patterned compensation film by the photo-polymerizing process.

Figure 6:
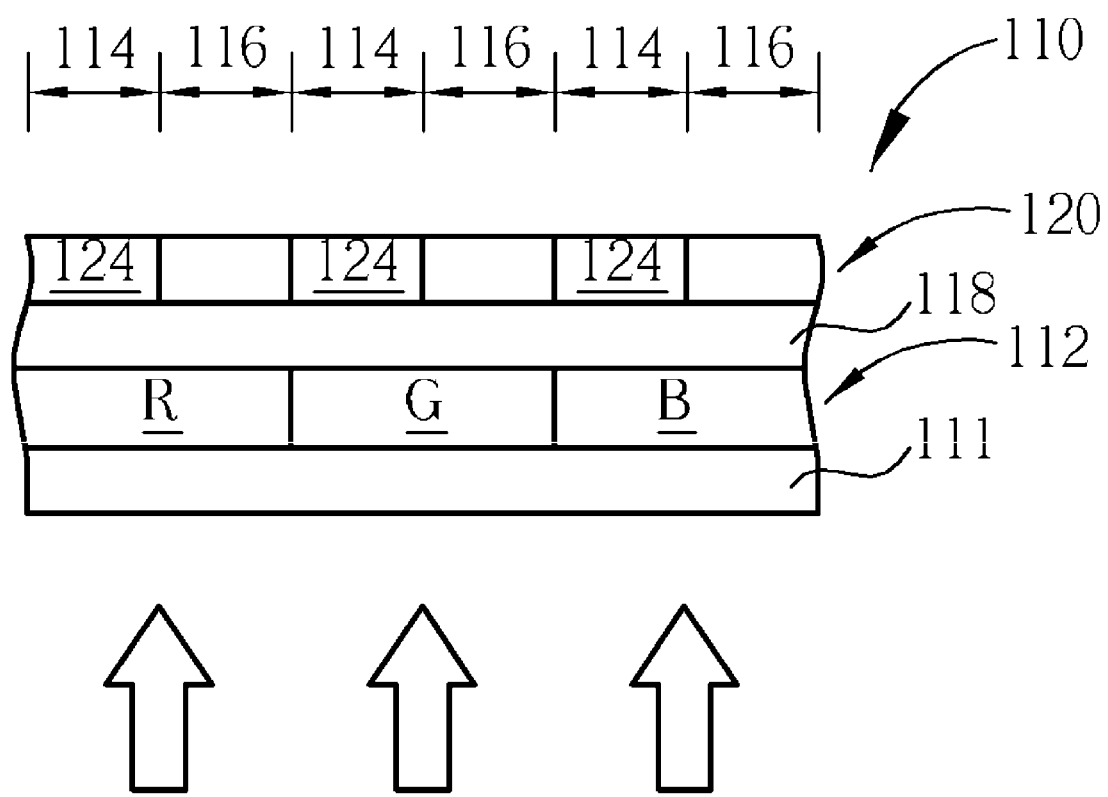

Next, as shown in FIG. 6 and the step 78 of FIG. 9, a second heating process is performed. The second heating process can heat the First substrate 110 until reaching a predetermined temperature, and maintains the first substrate 110 at the predetermined temperature for a first predetermined time period. The predetermined temperature of the second heating process can be higher than or equal to the clearing point of the reactive liquid crystal monomers, and for example, can be in a range from about 100° C. to 240° C. The first predetermined time period of performing the second heating process can be substantially longer than or equal to 30 seconds, but should not be limited thereto.

Thereafter, as shown in FIG. 7 and the step 80 of FIG. 9, the first substrate 110 is maintained in a non-oxygen condition and at the above-mentioned predetermined temperature for a second predetermined time period. The predetermined temperature is kept by heating, and the second predetermined time period can be substantially longer than or equal to 30 seconds, but should not be limited thereto. In this procedure, the remaining compensation material 120 can thermal-polymerizes. Thus, the compensation material 120 disposed in the transmission region 116 can form an isotropic zone 126 of the patterned compensation film, and a patterned compensation film 128 is therefore formed. The non-oxygen condition can be formed by any methods. For example, at least one inert gas, such as nitrogen gas, which does not cause chemical reactions, is provided into the process chamber to drive the oxygen gas out the process chamber.

Furthermore, as shown in FIG. 8 and the step 82 and the step 84 of FIG. 9, a second substrate 130 and a liquid crystal layer 140 are provided. The second substrate 130 is disposed parallel to the first substrate 110, and the liquid crystal layer 140 is disposed between the first substrate 110 and the second substrate 130. The second substrate 130 can be applied as an array substrate of the transflective LCD panel 100, and the liquid crystal layer 140 can control the light propagations in each sub-pixel region of the transflective LCD panel 100.

The second substrate 130 can include a plurality of sub-pixel regions 132, and each of the sub-pixel regions 132 can include a transmission region 136 and a reflective region 134. The transmission region 136 and the reflective region 134 can corresponds to the transmission region 116 and the reflective region 114 of the first substrate 110 respectively. The reflective region 134 of the second substrate 130 can include a reflective electrode (not shown in the drawings) to reflect the ambient light penetrating through the liquid crystal layer 140 for image display. The transmission region 136 of the second substrate 130 can include an transparent electrode (not shown) to allow the light beams radiating from the backlight module penetrating through transflective LCD panel 100 for image display. Both the outer surface of the first substrate 110 and the outer surface of the second substrate 130 can be attached to a polarizer (not shown) that can control the polarization of light entering and exiting the transflective LCD panel 100.

Since light beams with different color have different wavelengths, the phase retardations of light beams having different wavelengths are different when the light beams penetrate through the liquid crystal layer. Therefore, it is preferred that birefringent zones corresponding to color filters having different color can cause different phase compensations. In the above-mentioned photo-polymerizing process, different photo energies can be provided on different regions of the birefringent zone to reach different polymerizing proportions of the compensation material, so that the different regions of the birefringent zone cause different phase compensations. Please refer to FIG. 10, which is a schematic diagram illustrating a method of forming a transflective LCD panel in accordance with another preferred embodiment of the present invention, where like numbered numerals designate similar or the same parts, regions or elements. The transparent substrate 111, the color filter layer 112, the transmission region 116, the reflective region 114, the alignment layer 118, the compensation material 120, the first heating process, the second heating process, the heating step in the non-oxygen condition and the substrates-attaching step of this embodiment are similar to those in the above-mentioned embodiment. One of the main differences between this embodiment and the above-mentioned embodiment is that this embodiment utilizes a mask, which can provide different transmittances in different regions, such as a gray mask, a halftone mask or a phase-shift mask the mask.

Figure 10:
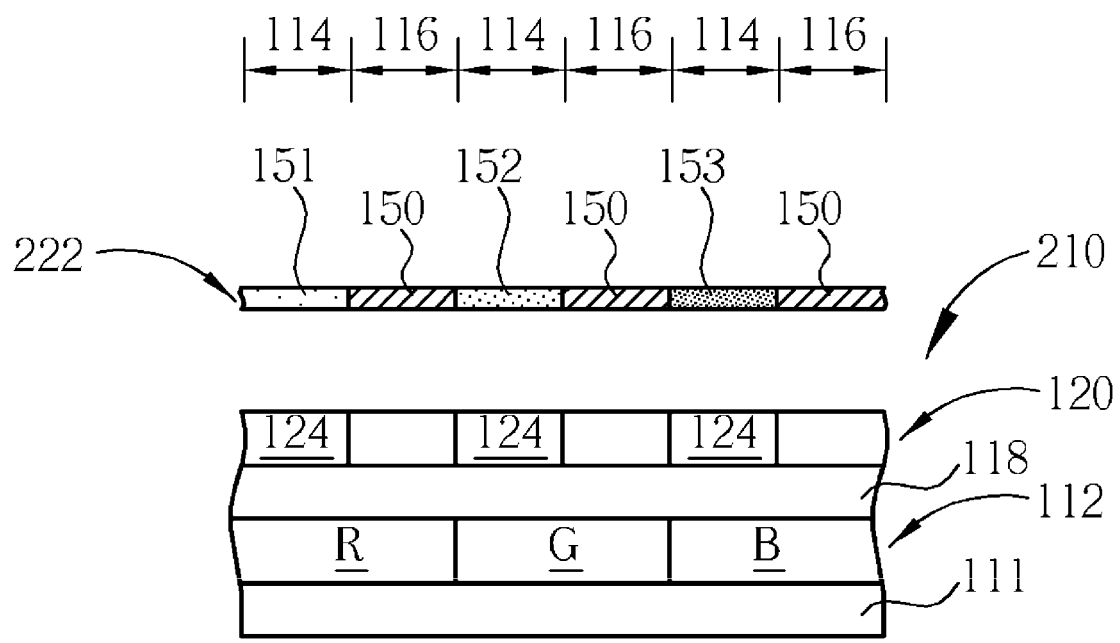
FIG. 10 is a schematic diagram illustrating a method of forming a transflective LCD panel in accordance with another preferred embodiment of the present invention.

As shown in FIG. 10, a photo-polymerizing process, such as an UV curing process, is performed on the first substrate 210 by utilizing a mask 222. The mask 222 can be a mask, which can provide different transmittances in different regions, such as a gray mask, a halftone mask or a phase-shift mask the mask. In other words, the mask 222 can include a plurality of sheltering regions 150, at least one first pervious region 151, at least one second pervious region 152, and at least one third pervious region 153. In the procedure of performing the photo-polymerizing process, the first pervious region 151 can correspond to the reflective region 114 of the red color filter R, the second pervious region 152 can correspond to the reflective region 114 of the green color filter G, the third pervious region 153 can correspond to the reflective region 114 of the blue color filter B, and the sheltering regions 150 can cover the compensation material 120 disposed in the transmission region 116.

Since the first pervious region 151, the second pervious region 152 and the third pervious region 153 of the mask 222 can have different transmittances respectively, and different exposing energy values can form different birefringent zones 224 having different phase compensations, the birefringent zones 224 corresponding to the red color filter R, the green color filter G and the blue color filter B can provide different phase compensations, and a preferred compensation effect. For example, the transmittance of the first pervious region 151 can be larger than the transmittance of the second pervious region 152, and the transmittance of the second pervious region 152 can be larger than the transmittance of the third pervious region 153 so as to match up the different color filters with red, green and blue color. Accordingly, the present invention can use a single photo-polymerizing process to form the birefringent zone that can cause different phase compensations, and provide the preferred compensation effect.

The different regions of the compensation material can be radiated for different time periods to reach different polymerizing proportions of the compensation material, so that the different regions of the birefringent zone cause different phase compensations. Please refer to FIG. 11 through FIG. 13, which are schematic diagrams illustrating a method of forming a transflective LCD panel in accordance with another preferred embodiment of the present invention, where like numbered numerals designate similar or the same parts, regions or elements. The transparent substrate 111, the color filter layer 112, the transmission region 116, the reflective region 114, the alignment layer 118, the compensation material 120, the first heating process, the second heating process, the heating step in the non-oxygen condition and the substrates-attaching step of this embodiment are similar to those in the above-mentioned embodiment. One of the main differences between this embodiment and the above-mentioned embodiments is that the photo-polymerizing process of this embodiment includes a plurality of radiating steps so that the different portions of the compensation material can be radiated for different time periods.

Figure 11:
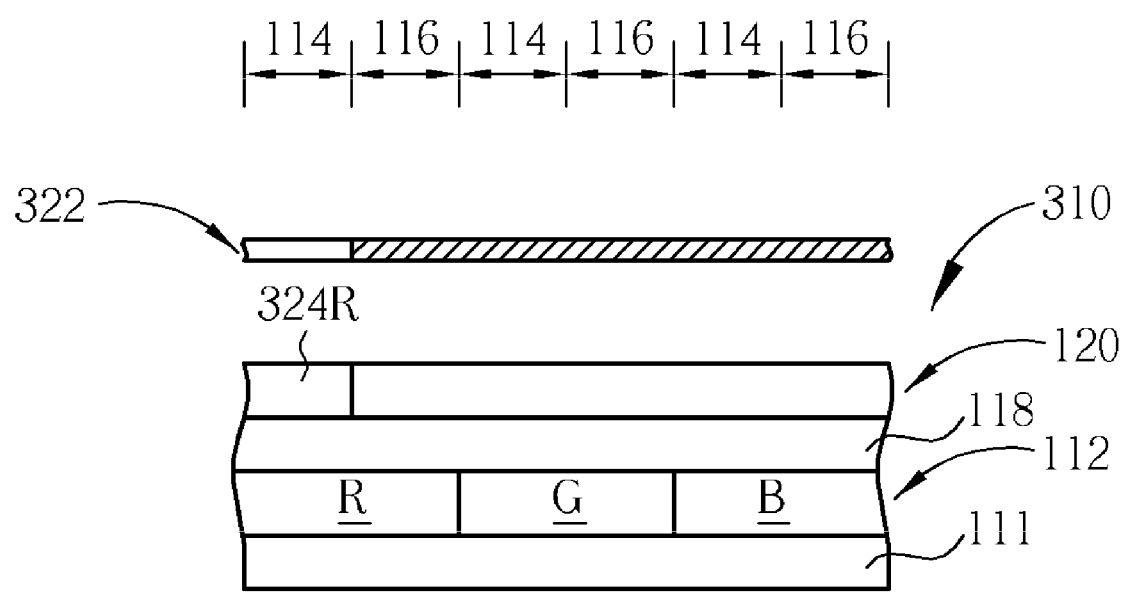
FIG. 11 through FIG. 13 are schematic diagrams illustrating a method of forming a transflective LCD panel in accordance with another preferred embodiment of the present invention.

As shown in FIG. 11, a first radiating step, such as an UV curing process, is first performed on the first substrate 310. In the first radiating step, the mask 322 can expose portions of the compensation material 120 disposed in the reflective region 114 of the red color filter R, and cover other portions of the compensation material 120 disposed in the other reflective region 114 and the transmission region 116. As a result, the portions of the compensation material 120 disposed in the reflective region 114 of the red color filter R can be exposed to the UV light, can be cured, and can be turned into the birefringent zones 324R of the patterned compensation film.

Figure 12:
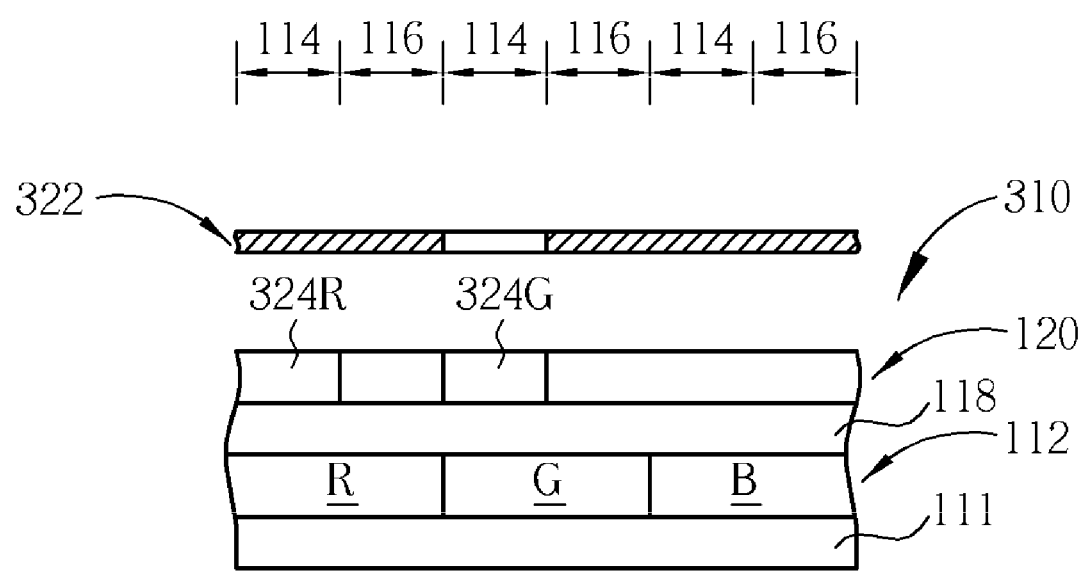
Figure 13:
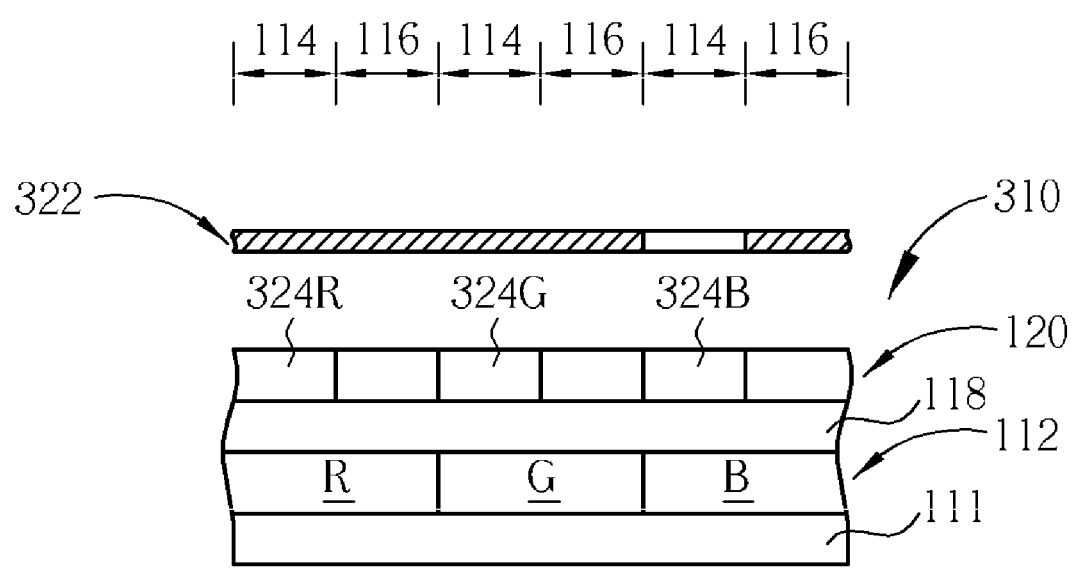

Similarly, as shown in FIG. 12, a second radiating step is performed on the first substrate 310. In the second radiating step, the position of the mask 322 is changed to expose portions of the compensation material 120 disposed in the reflective region 114 of the green color filter G, and to cover other portions of the compensation material 120 disposed in the other reflective region 114 and the transmission region 116. Accordingly, the portions of the compensation material 120 disposed in the reflective region 114 of the green color filter G can be turned into the birefringent zones 324G of the patterned compensation film. Thereafter, as shown in FIG. 13 a third radiating step is performed on the first substrate 310. In the third radiating step, the position of the mask 322 is changed to expose portions of the compensation material 120 disposed in the reflective region 114 of the blue color filter B, and to cover other portions of the compensation material 120 disposed in the other reflective region 114 and the transmission region 116. Accordingly, the portions of the compensation material 120 disposed in the reflective region 114 of the blue color filter B can be turned into the birefringent zones 324B of the patterned compensation film.

The birefringent zones 324R, 324G, 324B corresponding to the red color filter R, the green color filter G and the blue color filter B respectively can cause different phase compensations by adjusting the performing times of the first radiating step, the second radiating step and the third radiating step, so the present invention provide the preferred compensation effect. For instance, the performing time of the first radiating step can be larger than the performing time of the second radiating step, and the performing time of the second radiating step can be larger than the performing time of the third radiating step so as to match up the different color filters with red, green and blue color. Accordingly, the present invention can form the birefringent zone, which can cause different phase compensations, by accurately adjusting the recipes of the radiating steps according to the process condition, and according to the curing conditions of the birefringent zones 324R, 324G, 324B.

The mask for the radiating steps should not be limited to the above-mentioned embodiments. The first, second and third radiating steps can use different masks to performing the radiating steps. In addition, the forming order of the birefringent zone 324R, the birefringent zone 324G and the birefringent zone 324B can also be adjusted as required. Furthermore, the said performing order of the performing the aforementioned processes and steps can be adjusted as required, and not limited to the above-mentioned embodiments. For example, the substrates-attaching step can first combine the first substrate 110 and the second substrate 130, and next injects the liquid crystal layer 140 between the first substrate 110 and the second substrate 130. In other embodiment, the substrates-attaching step can first dispose the liquid crystal layer 140 on the second substrate 130, and next combines the first substrate 110 and the second substrate 130.

Since the present invention can form the birefringent zones of the patterned compensation film by a photo-polymerizing process, and afterward can form the isotropic zones of the patterned compensation film by a single thermal-polymerizing process, the needed transflective LCD panel can be formed by a standardized process and a standardized flowchart. Therefore, the present invention not only can simplify the process complexity of forming the transflective LCD panel, but also can reduce the process cost. Moreover, since different photo energies can be provided on different regions of the birefringent zone to reach different polymerizing proportions of the compensation material, the different regions of the birefringent zone can cause different phase compensations for light beams penetrating through the different color filters with red, green and blue color. Accordingly, the present invention can provide the preferred compensation effect, and improves the display image quality.

Those skilled in the art will readily observe that numerous modifications and alterations of the device and method may be made while retaining the teachings of the invention.

What is claimed is:

1. A method of forming a transflective LCD panel, comprising:
   providing a first substrate, comprising a color filter layer disposed on a side, further comprising at least one transmission region and at least one reflective region;
   forming a compensation material on the color filter layer, comprising a plurality of reactive liquid crystal monomers and at least one thermal initiator;
   performing a first heating process on the compensation material;
   performing a photo-polymerizing process to polymerize portions of the compensation material so as to form a birefringent zone of a patterned compensation film that corresponds to the reflective region;
   performing a second heating process to maintain the first substrate at a predetermined temperature for a first time period;
   maintaining the first substrate in a non-oxygen condition and at the predetermined temperature for a second time period, so as to form an isotropic zone of the patterned compensation film that corresponds to the transmission region;
   providing a second substrate, paralleling the first substrate; and
   providing a liquid crystal layer disposed between the first and the second substrates.

2. The method of claim 1, wherein the thermal initiator comprises lauroyl peroxide, cumene hydroperoxide, tert-butyl peroxybenzoate, tert-butyl peroxide, benzoyl peroxide, 2-methylpropionitrile, cyclohexanecarbonitrile, tert-amyl peroxybenzoate, 4,4-azobis(4-cyanovaleric acid), 1,1'-azobis (cyclohexanecarbonitrile), 2,2'-azobisisobutyronitrile (AIBN), 2,2-bis(tert-butylperoxy)butane, 1,1-bis(tert-butylperoxy)cyclohexane, 2,5-bis(tert-butylperoxy)-2,5-dimethylhexane, 2,5-bis(tert-butylperoxy)-2,5-dimethyl-3-hexyne, bis(1-(tert-butylperoxy)-1-methylethyl)benzene, 1,1-bis(tert-butylperoxy)-3,3,5-trimethylcyclohexane, tert-butyl hydroperoxide, tert-butyl peracetate, tert-butylperoxy isopropyl carbonate, cyclohexanone peroxide, dicumyl peroxide, 2,4-pentanedione peroxide, peracetic acid, potassium persulfate or a mixture of at least two of the above-mentioned materials.

3. The method of claim 1, wherein the compensation material further comprises at least one photo initiator.

4. The method of claim 3, wherein the photo initiator comprises 2-isopropylthioxanthone (ITX), 2-chlorothioxanthone (CTX), 2-methyl-1-[4-(methylthio)phenyl]-2-morpholinopropanone-1,1-chloro-4-propoxythioxanthone (OPTX), 2-benzyl-2-(dimethylamino)-1-[4-(4-morpholinyl)phenyl]-1-butanone, 2,4,6-trimethyl benzoyl diphenyl phosphine oxide (TPO), 1-hydroxy cyclohexyl phenyl ketone, 2-hydroxy-2-methyl-phenyl-propan-1-one, or a mixture of at least two of the above-mentioned materials.

5. The method of claim 1, wherein the compensation material comprises at least one solvent.

6. The method of claim 5, wherein the solvent comprises methyl ethyl ketone (MEK), toluene, propylene glycol methyl ether acetate (PGMEA), cyclohexanone, ethyl acetate, or a mixture of at least two of the above-mentioned materials.

7. The method of claim 1, wherein the first heating process comprises a baking process.

8. The method of claim 1, wherein the first heating process comprises maintaining the first substrate in a temperature range from 50° C. to 90° C. for a third time period.

9. The method of claim 8, wherein the third time period is longer than or equal to 30 seconds.

10. The method of claim 1, wherein a photo-polymerizing process comprises an ultraviolet (UV) curing process.

11. The method of claim 1, wherein the photo-polymerizing process utilizes a mask to cover portions of the compensation material corresponding to the transmission region, and the mask exposes portions of the compensation material corresponding to the reflective region so that the exposed portions of the compensation material undergoes the photo-polymerizing process.

12. The method of claim 11, wherein the photo-polymerizing process comprises providing different photo energies on different regions of the birefringent zone to reach different polymerizing proportions of the compensation material, so that the different regions of the birefringent zone cause different phase compensations.

13. The method of claim 12, wherein the color filter layer comprises at least one red color filter, at least one green color filter and at least one blue color filter, and the different regions of the birefringent zone corresponding to the red, green and blue color filters cause different phase compensations.

14. The method of claim 12, wherein the step of providing different photo energies comprises radiating the different regions of the compensation material for different time periods, or by utilizing the mask having different transmittances in different regions.

15. The method of claim 1, wherein the first time period and the second time period are longer than or equal to 30 seconds respectively.

16. The method of claim 1, wherein the step of maintaining the first substrate in the non-oxygen condition comprises providing nitrogen gas in to a chamber to form the non-oxygen condition.

17. The method of claim 1, further comprising forming an alignment layer on a surface of the color filter layer before forming the compensation material.

18. The method of claim 1, wherein the compensation material comprises:

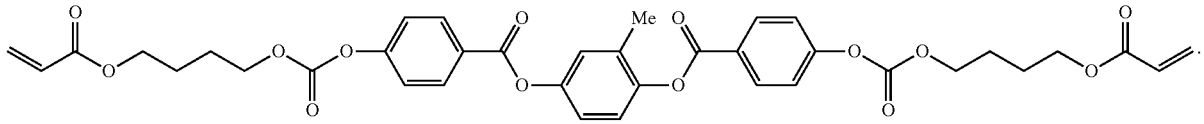 [SMILES: C=CC(=O)OCCCCOC(=O)Oc1ccc(C(=O)Oc2ccc(OC(=O)c3ccc(OC(=O)OCCCCOC(=O)C=C)cc3)c(C)c2)cc1]

19. The method of claim 1, wherein the predetermined temperature in the second heating process is higher than or equal to a clearing point of the reactive liquid crystal monomers.

20. The method of claim 1, wherein the predetermined temperature in the second heating process is in a range from 100° C. to 240° C.

* * * * *